United States Patent
Kornmann et al.

(10) Patent No.: US 9,213,856 B2
(45) Date of Patent: Dec. 15, 2015

(54) ROLE BASED ACCESS MANAGEMENT FOR BUSINESS OBJECT DATA STRUCTURES

(71) Applicants: Tim Kornmann, Reilingen (DE);
Marcel Hermanns, Heidelberg (DE);
Cristina Buchholz, Reilingen (DE);
Michael Hartel, Heidelberg (DE);
Daniel Zoch, Walldorf (DE)

(72) Inventors: Tim Kornmann, Reilingen (DE);
Marcel Hermanns, Heidelberg (DE);
Cristina Buchholz, Reilingen (DE);
Michael Hartel, Heidelberg (DE);
Daniel Zoch, Walldorf (DE)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 13/719,063

(22) Filed: Dec. 18, 2012

(65) Prior Publication Data
US 2014/0172918 A1    Jun. 19, 2014

(51) Int. Cl.
*G06F 17/30*    (2006.01)
*G06F 21/62*    (2013.01)

(52) U.S. Cl.
CPC .... *G06F 21/6218* (2013.01); *G06F 2221/2141* (2013.01)

(58) Field of Classification Search
CPC ............... G06F 2221/2141; G06F 21/6209; G06F 21/62; G06F 21/6218
USPC ......................................... 707/785, 786, 787
See application file for complete search history.

(56) References Cited

U.S. PATENT DOCUMENTS

| | | | | |
|---|---|---|---|---|
| 6,085,191 A | * | 7/2000 | Fisher | G06F 21/6227 707/737 |
| 6,202,066 B1 | * | 3/2001 | Barkley | G06F 21/6218 707/785 |
| 8,260,814 B2 | * | 9/2012 | Heilakka | G06F 17/30008 707/787 |
| 2006/0070124 A1 | * | 3/2006 | Arndt | G06F 21/78 726/17 |
| 2008/0256356 A1 | * | 10/2008 | Iyengar | H04L 9/32 713/155 |
| 2011/0107231 A1 | * | 5/2011 | Gueldemeister | G06Q 10/10 715/745 |
| 2011/0161342 A1 | * | 6/2011 | Boskamp | G06F 17/30477 707/769 |
| 2011/0302211 A1 | * | 12/2011 | Kilday | G06F 21/6218 707/785 |
| 2012/0331066 A1 | * | 12/2012 | Fitzgerald | H04L 67/24 709/206 |

* cited by examiner

*Primary Examiner* — Phong Nguyen
(74) *Attorney, Agent, or Firm* — Mintz Levin Cohn Ferris Glovsky and Popeo, P.C.

(57) ABSTRACT

A service request from a user is received to execute an operation on an instance of a business object. Thereafter, an access control check is performed to confirm whether the user is allowed to execute the requested operation on a type of business object corresponding to the business object specified and based on an access group associated with the user. Subsequently, the user is either provided with access to the instance of the business object to execute the operation if the access control check confirms that the user is allowed to execute the operation on the instance of the business object, or prevented from accessing the instance of the business object to execute the operation on the instance of the business object. Related apparatus, systems, techniques and articles are also described. Related apparatus, systems, techniques and articles are also described.

21 Claims, 4 Drawing Sheets

ROLE BASED ACCESS MANAGEMENT FOR BUSINESS OBJECT DATA STRUCTURES

TECHNICAL FIELD

The subject matter described herein relates to selectively providing access to business object data structures in response to service requests based on role based access management.

BACKGROUND

Business object data structures encapsulate semantically related functionality and structure. A business object can include a hierarchy of semantically related nodes which represent data as attributes. In addition, a business object can be an independently viable entity with identifiable instances as well as bundle functions and data, both of which may be accessible from outside of the business object. Business objects can be described by a data model, an internal process model, and one or more typed service interfaces, and can be a core structuring element of applications that are centrally defined by a developer as part of an overall governance process.

Access control lists (ACL) can be used to selectively provide access to business object data structures. Conventional systems store such ACLs separately and distinctly from the corresponding business object data structures. As a result, during runtime, various table joins must be executed in order to utilize such ACLs. Such an arrangement consumes unnecessary processing resources and can increase the amount of time needed to respond to a particular service request.

SUMMARY

In one aspect, a service request from a user is received to execute an operation on an instance of a business object. Thereafter, an access control check is performed to confirm whether the user is allowed to execute the requested operation on a type of business object corresponding to the business object specified and based on an access group associated with the user. Subsequently, the user is either provided with access to the instance of the business object to execute the operation if the access control check confirms that the user is allowed to execute the operation on the instance of the business object, or prevented from accessing the instance of the business object to execute the operation on the instance of the business object.

The business object can include an access control list dependent object (ACL DO) that in turn comprises an access control list. The access control list can be used as part of the access control check to confirm whether the user is allowed to execute the requested operation. The access control list can specify which nodes of the business object are subject to instance control and which access groups can perform operations on each node of a business object instance. The access control list can also specify what operations can be performed on each node of the business object instance and by what access groups such operations can be performed.

The ACL DO can include a root node and an entry node. Each entry node of the ACL DO can store access control attributes in name-value pairs comprising access context and access group identifiers.

The access control list can specify temporal access limitations one or more nodes of the business object instance.

The ACL DO can be accessed via an access path specified by the business object. Access can be granted to the user to execute the operation on the instance of the business object if the access path cannot be traversed. Access to execute operation on the instance of the business object can be denied if the access path cannot be traversed.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter enables easier adoption and a generic implementation for providing access control restrictions on a business object instance level. In addition, by providing access control on particular business object fields, specific information can be conveyed to end users about why a particular authorization decision has been taken (as opposed to a blanket access denial).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
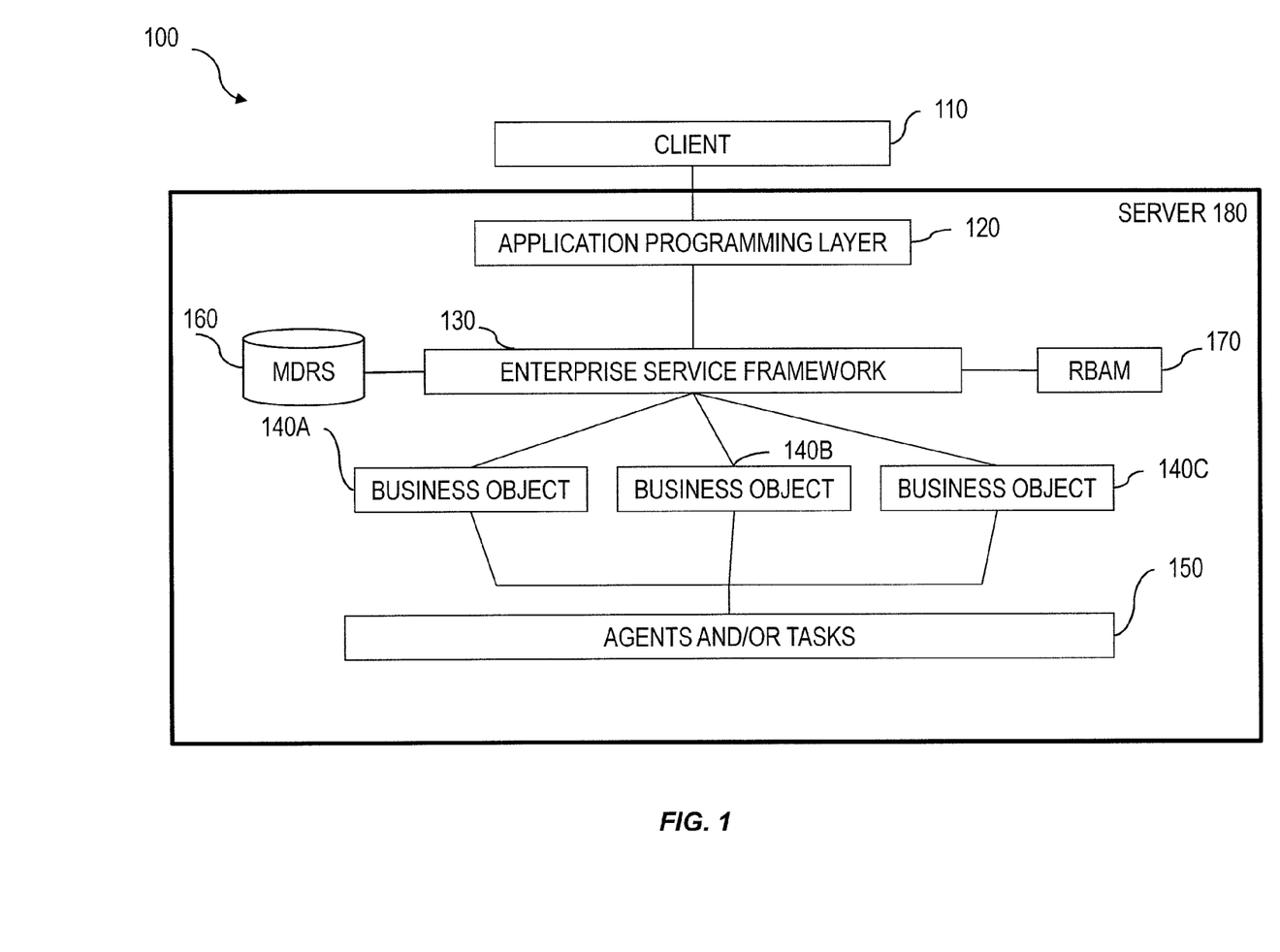
FIG. 1 is a process flow diagram illustrating an architecture for implementing a role based access management to business object data structures, according to at least one embodiment.

FIG. 1 illustrates a system 100 for processing data structures, such as business object data structures (also referred to herein as "business objects" or "business object instances"). The system 100 can process and store business object data (e.g., the data fields of a business object). Examples of processing can include: determining consistency of data of a data object, such as a business object including data; performing saving procedures to store data within a database and/or a repository; performing updates to data that can be in a business object (e.g., updates due to newly created, entered, and/or saved data); and performing any other tasks that can manipulate, maintain and/or store data in the data objects. The system 100 can be used to process various business objects (e.g., data structured according to a task, such as sales orders, a purchase orders, etc.).

A client application 110 can be used to enter, modify, update, etc. various data that can be processed and eventually passed to a business object 140 for storage, retrieval, etc. The client application 110 can interact with an application processing layer 120 (such as those encoded in the Advanced Business Application Programming (ABAP) language) for the purposes of processing the data, such as, for example, creating of sales orders, writing and editing reports and module pools, processing database table definitions, designing user interfaces, designing screens and flow logic, building function modules, etc.

The server 180 can be implemented as at least one processor and at least one memory and can include the application processing layer 120, an enterprise services framework 130, business objects 140, agents 150, a metadata repository 160 (MDRS) and a role-based access management module 170 (RBAM).

The application processing layer 120 can interact with a framework (e.g., an enterprise service framework ("ESF") 130), which in turn, can be configured to interact with at least one business object 140. An example of the ESF 130 is commercially available from SAP AG, Walldorf, Germany. The term "framework" can refer to a system of interrelated components, such as programs and the like, providing a business system for performing business functions. The ESF 130 can abstract the business objects, which can be modeled as services (also referred to as enterprise services) providing, for example, purchase order generation, sales order generation, and the like. Aggregating services into business-level enterprise services can provide more meaningful building blocks for the task of automating enterprise-scale business scenarios.

The ESF 130 can include a persistence repository for storing relevant pre-existing enterprise services, which can be made available to selected users. By using a repository, the selected users can use the pre-existing enterprise services to aid in the implementation of new services and corresponding business objects 140. As noted, a business object can represent an object, such as a data structure including data and operations of significance to a business. Examples of business objects 140 can include a purchase order, a sales order, a flight reservation, a shipping order, customer information, employee information, and the like. A service can thus provide an interface to enable other services and applications to access and process (e.g., create, fill-in, save, query, delete, print, send, and the like) the business object 140.

Business objects 140 and data related to the business objects 140 can be stored in a storage mechanism, such as a database or any other persistent storage repository. Metadata relating to the business objects 140 can be stored in the MDRS 160. As will be described in further detail below, the ESF 130 can poll or otherwise interact with the RBAM 170 to determine whether or not to grant a particular user access to a business object 140 in response to a service request. The system 100 can include an agent 150, which can be initiated upon receipt of data related to the business objects 140. For example, the agent 150 can be used to perform various tasks, such as update information related to business objects stored in the database, further process the data, determine the order of storing the data, perform various database update tasks, etc. In some implementations, agents 150 can serve as a bridge or a proxy for tasks, which can be executed after an initial task has been completed. In this case, agents can collect data and transform it in such a way so that the tasks can be processed later by other components in the system 100. Agents 150 can be configured to generate a message as output, where the message is provided to components in the system 100.

The MDRS 160 can be characterized as an infrastructure to support defining, storing, and provisioning of structured metadata. In particular, the MDRS 160 can provide metadata used by the ESF 130 that characterizes the business objects 140 to allow the business objects 140 responsive to a service request to be identified, accessed, and otherwise consumed.

The ESF 130 can generate a message indicating that the data that the client 110 entered has been successfully saved in the system 100. In addition, the ESF 130 can generate a message indicating that the data that the client 110 entered was not saved and/or that such data is locked. Such messages can be presented to the client 110 via a user interface in the form of a message, such as a Hypertext Markup Language ("HTML") message. In some implementations, if a sales order object is being created and saved by the client 110, the HTML message indicating successful storage of the data can also include a sales order number, which can confirm that a particular sales order has been created and saved to the system 100. In some implementations, the message can be presented by automatically updating the client's user interface, or by sending an email, an instant message, a text message, a multimedia message, etc. to the client 110, or in any other form. In order to save the business object data to the system 100, the system 100 can be configured to perform a save-and-exit procedure.

When the ESF 130 receives a service request to perform an operation on a business object 140, the RBAM 170 can perform two-tier access enforcement on the business object 140, in response to a service request being received by the ESF 130 from the client 110.

In response to a service request being received by the ESF 130 from the client 110, a functional access control check can be performed by the RBAM 170 to confirm that the active user at the client 110 is allowed to execute the requested operation on the requested type of business object/business object node. For example, the functional access control check can determine whether the user is allowed to create the business object Sales Order Items (i.e., the access context is checked). In some implementations, this function access control check cannot be influenced (e.g., disabled) by the business object(s).

If the functional access control check is successful, and if the business object 140 is correspondingly configured, the RBAM 170 can perform an instance-based access control check verifying that the user is allowed to perform the requested service on a particular requested instance of the business object 140 (i.e., the access group is checked). For example, the instance-based access control check can confirm whether the user is allowed to create items for a particular Sales Order with the ID 1234.

If both such access control checks indicate that the user can execute the requested operation on the particular instance of the business object, then the RBAM 170 can indicate the same to the ESF 130 to allow the requested service to proceed.

Figure 2:
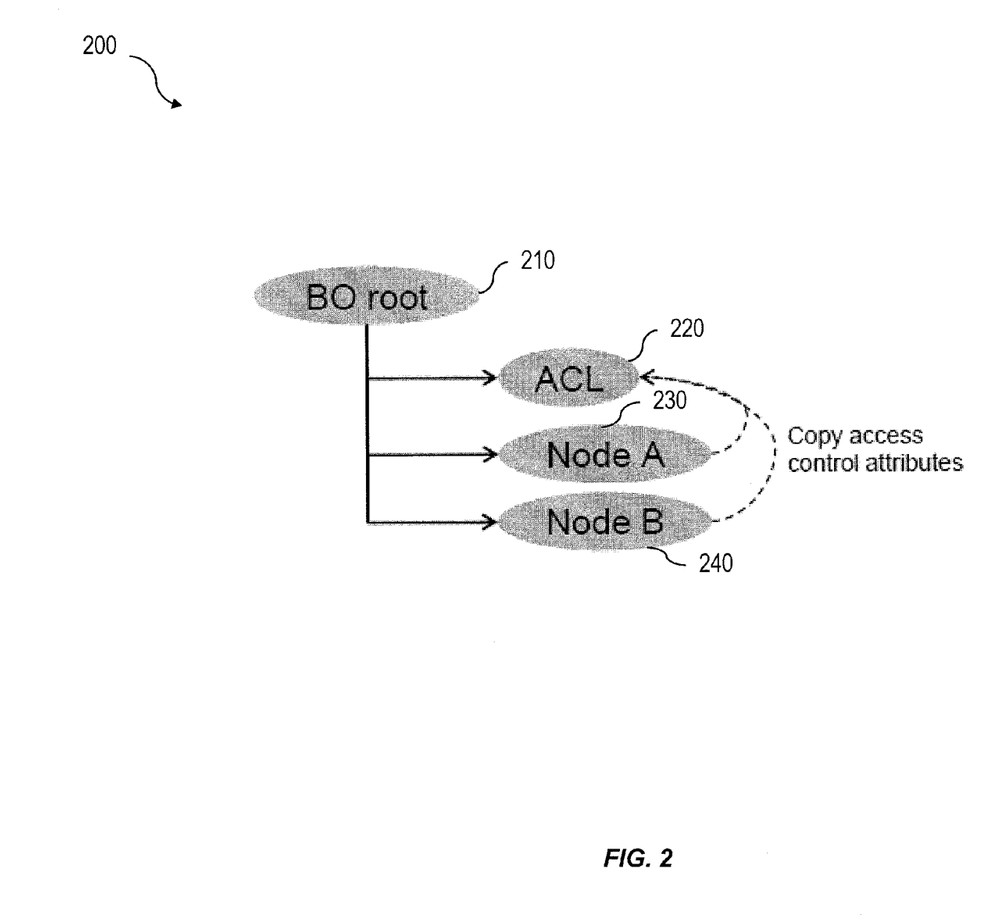
FIG. 2 is a diagram illustrating a business object with an access control dependent object, according to at least one embodiment.

With reference to the diagram 200 of FIG. 2, each business object can comprise a root node 210, an access control list dependent object (ACL DO) 220, as well as other nodes 230, 240. The ACL DO 220 can publish attributes that can be used, by the RBAM 170, in order to control the access to the instances of the corresponding business object 140. Stated differently, the ACL DO 220 can redundantly store business object attributes which are used for instance control in a common format. The ACL DO 220 in turn can comprise a root node and an entry node. The entry node can store access control attributes in name-value pairs comprising access context and access group identifiers. Such identifiers can be used to determine whether a particular user can access an instance of a business object.

Metadata (for example from the MDRS 180) associated with the business object 140 can specify which node element comprises the ACL DO 220. This metadata can also specify various fallback mechanisms and time-dependency for access control (both of which are described further below). The ACL DO 220 can store the access control attributes in its own tables for direct and fast access through RBAM 170 at runtime. The filling and updating of these tables can be done by the ESF 130 based on metadata maintained by the business object 140 in the MDRS 180.

Triggers for updating the ACL DO 220 can include any change to the BO 140 that affects the nodes contained in the corresponding access control path (i.e., the path leading to an access control attribute). When changes to the attributes contained in the access control path are done, before saving them, the path can be reevaluated and changes to the ACL content are completed. The access control path can include a series of steps with each step leading from one node element to another by the means of a modeled association. Whenever there is a modification to a node element, the ACL path evaluation can start by first following the association to the root of the BO, then starting down the access control paths by evaluating one association at a time and collecting the target nodes to be the starting point for the next association. This can all be done in the same processing step, before saving changes, in order to maintain consistency between BO and ACL content. An extension to this arrangement can involve tackling changes done to another BO, which has not been changed in the current transaction but contains path attributes affected by the current transaction.

Updating can be implemented, for example, by: (i) analyzing changes implicated by the current transaction (i.e., the transaction specified by the corresponding service request), (ii) identifying BO instances with outdated ACLs, (iii) delete the outdated ACL instances, (iv) following a modeled path to access control attributes and copy the attributes to the ACL entries, and (v) providing fallback attribute values and fallback time-dependency values if indicated.

There can be one fallback attribute value that can be used; it is a constant and if filled into the ACL, it can signal that everybody having access to the BO service can have access to this particular BO instance. This feature can be used, for example, in transitory phase in a BO lifecycle during which there is still insufficient data for the BO to be assigned to an owner/organization/other type of authority. The attribute "if indicated" can refer to the Boolean value grant/deny which is part of the access control path. If access is to be granted whenever data is insufficient to determine an access control attribute value, the above can apply. If the fallback attribute value is "deny", the entry can be skipped altogether. The result of this is that only a super-user with unrestricted authorizations for this BO (authorizations encompassing every BO instance) can have access to the BO instance and will be able to resolve the situation by completing BO data such with an appropriate fallback given the level of sensitivity of the data concerned and the business processes involved. Time dependent fallback values can be provided that specify date/time ranges and they can be applied whenever the access control path does not specify its own attributes holding such data. In addition, instance control declarations can be provided so that business objects 140 may declare in the MDRS 170 that they use an ACL DO for instance control.

The ACL DO 220 can specify an access context that represents the type of the access control attribute which can be used as part of the functional access control check. The ACL DO 220 can also specify an access control attribute that represents a particular instance of a business object which can be used as part of the instance-based access control check.

Various types of access contexts can be utilized including, but not limited to: Company, Employee, Business Partner, Site, Organizational Unit, User/Identity. For example, one can have the corresponding access control attributes SAP AG (Company), D034015 (Employee), AKRON (Business Partner), Walldorf (Site), SAP AG (Organizational Unit), D034015 (Identity). As indicated, one attribute can be used in various contexts, receiving a different meaning in each of them. Accordingly, the access control can also takes both elements, that is access context and access control attribute, into account when enforcing access. Applied to the example above, a BO Shopping Cart can have SAP AG as both Company and Organizational Unit in its ACL. Users approving the purchase request (usually the Managers of the Employee requesting the purchase) can be granted the authority to approve the content of the Shopping Cart, using the context Organizational Unit SAP AG. Users responsible for executing the purchase by sending the request to an external vendor (agents in the Purchasing department) can have the authority to execute the purchase in the context Company SAP AG. Although SAG AG will be present twice in the ACL, the two contexts do not mix. For example, it can happen that for an intermediate stage of the Shopping cart BO, the Company cannot be determined yet, resulting in a missing entry for the access context Company. This results in the purchasing department not having access at all to this BO instance. The situation can be resolved by the Manager approving the Shopping Cart and providing additional data such that the assignment to the Company can finally be made and the corresponding ACL entry filled. The value filled for the Company entry can also differ from the Organizational Unit entry, resulting in the purchasing agent authorized for SAP AG not having access to the BO instance even though SAP AG as an attribute is present in the ACL (but for the wrong access context).

Figure 3:
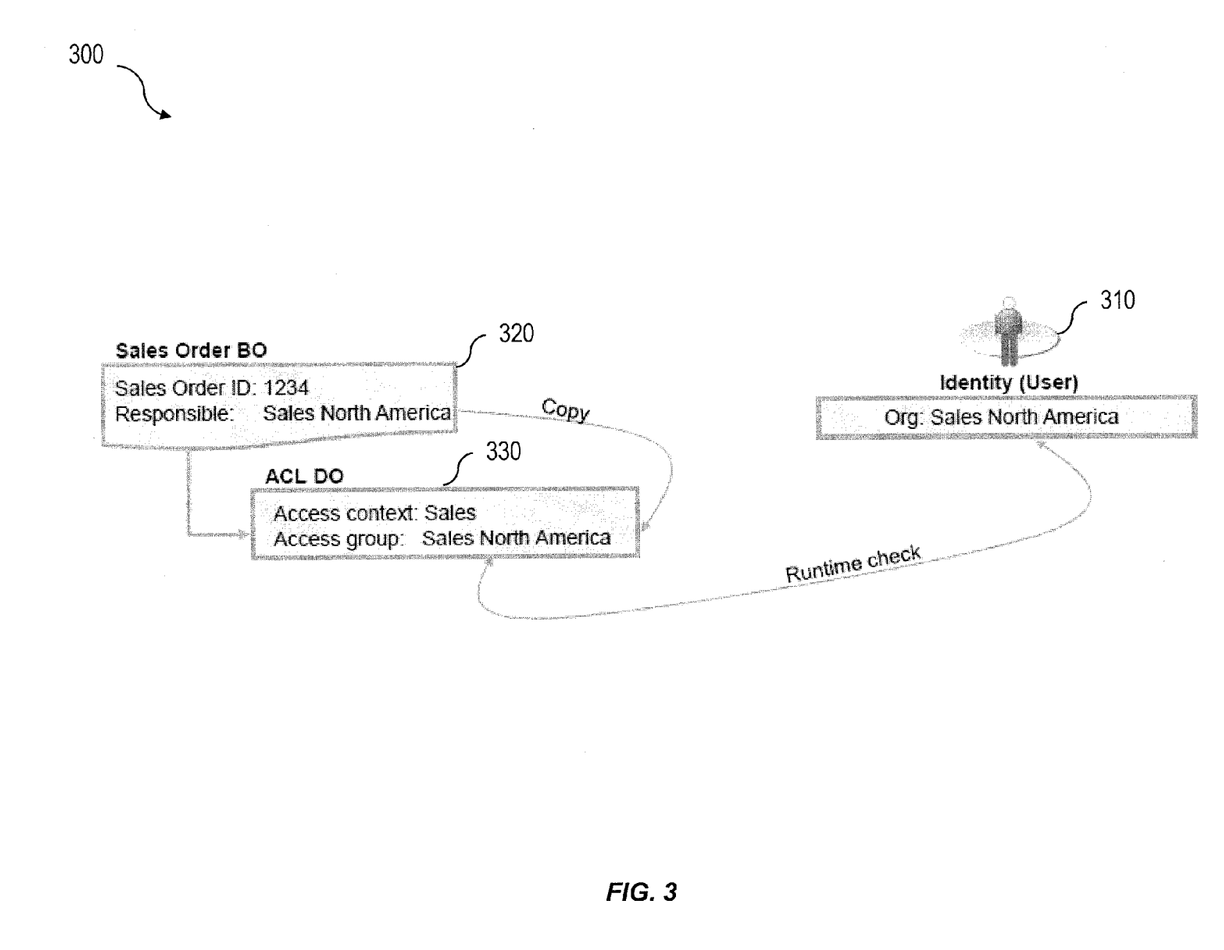
FIG. 3 is a diagram illustrating a runtime check using an access control dependent object to grant access to a user to copy an instance of a business object, according to at least one embodiment.

With reference to diagram 300 of FIG. 3, a user 310 seeks to access a particular instance (e.g., item 1234) of a sales business object 320 as part of a copy interaction. The ESF 130, upon receiving a corresponding service request, accesses the RBAM 170. The RBAM 170 performs a runtime check of an access control list dependent object (ACL DO) 330 of the business object 320. As noted in the diagram 300, the user is part of an organization group: Sales North America. The ACL DO 330 specifies that the context required to access the business object 320 and the access group is Sales North America. Both of the checks described above can be performed by the RBAM 160 using the ACL DO 330 so that runtime access can be provided to the user 310 to copy the business object 320.

The access control attribute can be represented by an element of type UUID (Product Category UUID), usually, but not necessarily, pointing to the respective business object 140. The path to the access control attribute can always starts at the root node of the business object 140 and consists of associations. The path to the access control attribute can contain implemented associations and it can lead to nodes of other business objects 140. The path can, for example, be maintained in Advanced Business Application Programming Query Language (ABQL) notation. The path analysis can be executed using an ABQL parser.

As used herein, time-dependency refers a temporal time period in which certain access restrictions may be placed on a business object and/or business object instance. Time-dependency can be expressed, for example, by a node element of the type "ESF_CLOSED_DATE_PERIOD" contained in the same node as the UUID. Not only can node elements specify when certain time dependencies expire, it can specify when such time dependencies start and/or a period during which a user can access a particular business object and/or business object instance (i.e., a pre-defined time period after the service request, etc.).

As used herein, fallback behavior can determine an access decision in cases in which the access control attribute cannot be found by following the specified path, either because a business object instance is in a draft state, or because the access control attributes for an instance cannot be yet fully specified because of business considerations. There can only be one value possible and expected per access context.

One fallback behavior can be denying access to the business object (which can be default value). Denying access can include only users with unrestricted authorizations for the corresponding business object 140 and access context have access to business object instances with incompletely specified attributes. An alternative fallback behavior can be to grant access. Granting access can include every user authorized for this business object 140 and access context, regardless of their respective instance restrictions, can have access to business object instances with incompletely specified attributes.

The ACL DOs can be updated through ACL notifications. In particular, the access control paths might lead to nodes outside of the business object with an ACL, which means that ACL-relevant changes sometimes happen in sessions where an ACL host is not involved. The ACL notification mechanism can be called, and may listen to changes to ACL-relevant business object nodes and may initiate an ACL refresh of the corresponding host business objects. Such a mechanism can comprise: (i) evaluating changes in the change handler of the current transaction (i.e., the transaction specified by the service request), (ii) deciding which changes are ACL relevant by reading the ACL registry, and (iii) initiating an ACL refresh for each host BO (type) by recalling a finalize operation for the corresponding BO.

In most cases, the access control path can contain only attributes belonging to the own BO instance. If any change to the BO is made in the current transaction, the ACL content can be reevaluated. The modified BO instances can already be part of the transactional context, and as such it is easy to identify them. A more complicated scenario happens when the access control paths lead to targets outside of the BO instance, or outside of the BO type altogether. For example, the BO Sales Order can use information from the BO Employee in order to determine responsible Sales Organization which is part of the content of its ACL. When changes to the BO Employee are made, there is typically no feedback to the BO Sales Order, which would result in the ACL of the Sales Order containing the wrong Sales Organization. In order to avoid this scenario, a registration mechanism can be provided. Namely, whenever access control paths are evaluated (usually when creating a BO instance), the external BO instances used during evaluation can be registered as access control relevant for changes to the original BO instance. This registration information can then be used to determine which BO instances except the directly modified ones, need to be refreshed/have their ACL reevaluated.

Figure 4:
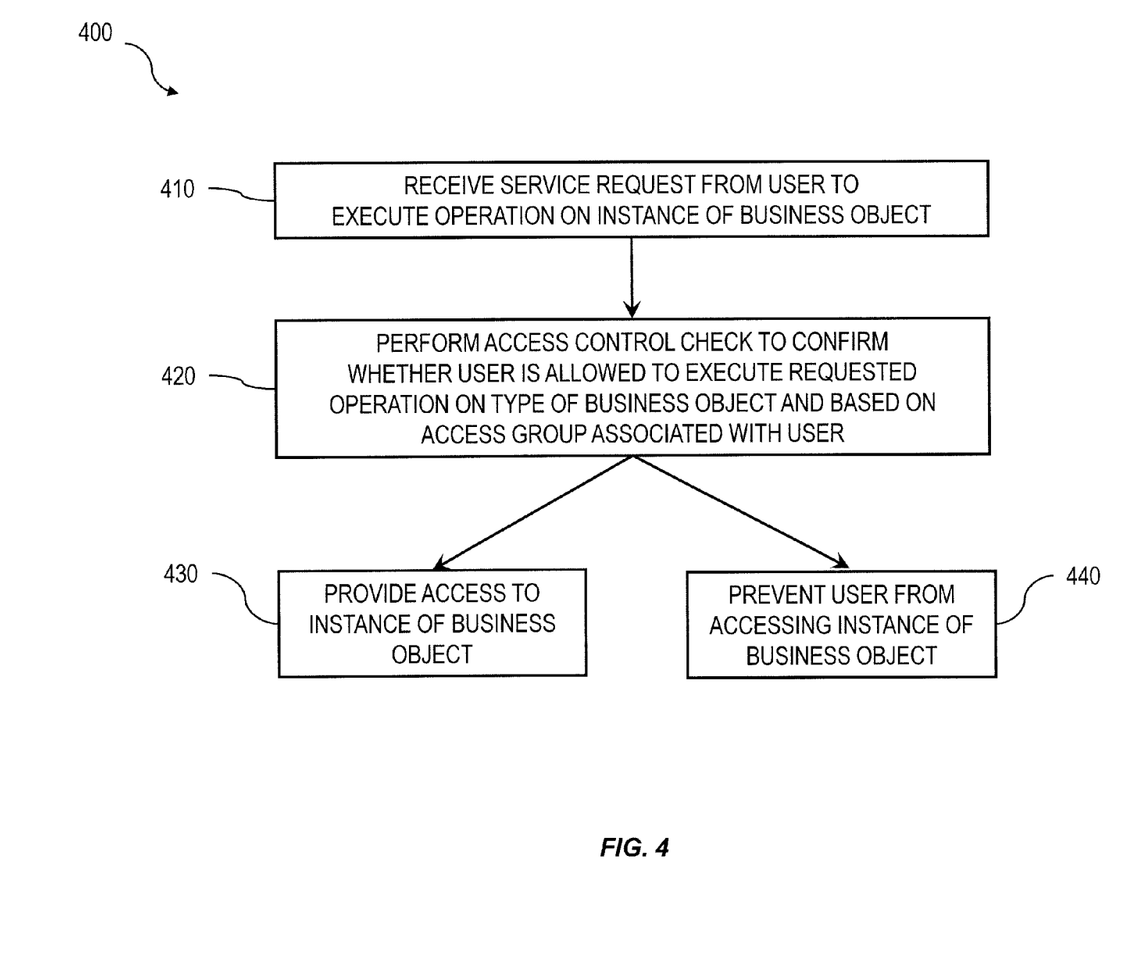
FIG. 4 is a process flow diagram illustrating a method of providing role based access management for business object data structures, according to at least one embodiment.

FIG. 4 is a process flow diagram 400 illustrating a method in which, at 410, a service request is received from a user to execute an operation on an instance of a business object. Thereafter, at 420, an access control check is performed to confirm whether the user is allowed to execute the requested operation on a type of business object corresponding to the business object specified and based on an access group associated with the user. Based on the access control check, the user, at 430, can be provided with access to the instance of the business object to execute the operation if the access control check confirms that the user is allowed to execute the operation on the instance of the business object. Otherwise, at 440, the user can be prevented from accessing the instance of the business object to execute the requested operation.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, functional programming language, logical programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and an interface such as a touch screen and/or a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors comprising:
   receiving, by at least one data processor, a service request from a user to execute an operation on an instance of a business object, the business object comprising a plurality of nodes descending from a root node;
   performing, by at least one data processor, an access control check to confirm whether the user is allowed to execute the requested operation on a type of business object corresponding to the business object specified and based on an access group associated with the user; and
   providing, by at least one data processor, the user with access to the instance of the business object to execute the operation if the access control check confirms that the user is allowed to execute the operation on the instance of the business object; or
   preventing, by at least one data processor, the user from accessing the instance of the business object to execute the operation on the instance of the business object;
   wherein:
   metadata associated with the business object identifies one node of the business object as comprising an access control list dependent object (ACL DO),
   the ACL DO comprises an access control list,
   the access control list is used as part of the access control check to confirm whether the user is allowed to execute the requested operation,
   the access control list specifies which nodes of the business object are subject to instance control and which nodes of the business object are not subject to instance control,
   the access control list further specifies which access groups can perform operations on each node of a business object instance,
   the ACL DO is updated prior to saving the business object by using a modeled association of the nodes of the business object when one or more nodes of the business object specified as being part of an access control path by the ACL DO are changed.

2. A method as in claim 1, wherein the access control list further specifies what operations can performed on each node of the business object instance and by what access groups such operations can be performed.

3. A method as in claim 1, wherein the ACL DO comprises a root node and an entry node.

4. A method as in claim 3, wherein each entry node of the ACL DO stores access control attributes in name-value pairs comprising access context and access group identifiers.

5. A method as in claim 1, wherein the access control list specifies temporal access limitations one or more nodes of the business object instance.

6. A method as in claim 1, wherein the ACL DO is accessed via an access path within the business object that is specified by the business object.

7. A method as in claim 6, further comprising: granting, by at least one data processor, access to the user to execute the operation on the instance of the business object if the access path can be traversed.

8. A method as in claim 6, further comprising: denying access to the user to execute the operation on the instance of the business object if the access path cannot be traversed.

9. A method as in claim 1, wherein the updating of the ACL DO comprises:
   analyzing changes implicated by a transaction specified by the service request;
   identifying business object instances with outdated ACL DOs;
   deleting the outdated ACL DO instances;
   following a modeled path to access control attributes and copying the attributes to entries in the ACL DO; and
   providing fallback attribute values and fallback time-dependency values if indicated by a Boolean value in the ACL DO.

10. A non-transitory computer program product storing instructions which, when executed by at least one data processor, result in operations comprising:
    receiving a service request from a user to execute an operation on an instance of a business object, the business object comprising a plurality of nodes descending from a root node;
    performing an access control check to confirm whether the user is allowed to execute the requested operation on a type of business object corresponding to the business object specified and based on an access group associated with the user; and
    providing the user with access to the instance of the business object to execute the operation if the access control check confirms that the user is allowed to execute the operation on the instance of the business object; or
    preventing the user from accessing the instance of the business object to execute the operation on the instance of the business object;
    wherein metadata associated with the business object identifies one node of the business object as comprising an access control list dependent object (ACL DO), the ACL DO comprising an access control list, the access control list being used as part of the access control check to confirm whether the user is allowed to execute the requested operation, the access control list specifying which nodes of the business object are subject to instance control and which nodes of the business object are not subject to instance control, the access control list further specifying which access groups can perform operations on each node of a business object instance, the ACL DO being updated prior to saving the business object by using a modeled association of the nodes of the business object when one or more nodes of the business object specified as being part of an access control path by the ACL DO are changed.

11. A computer program product as in claim 10, wherein the access control list further specifies what operations can performed on each node of the business object instance and by what access groups such operations can be performed.

12. A computer program product as in claim 10, wherein the ACL DO comprises a root node and an entry node.

13. A computer program product as in claim 12, wherein each entry node of the ACL DO stores access control attributes in name-value pairs comprising access context and access group identifiers.

14. A computer program product as in claim 10, wherein the access control list specifies temporal access limitations one or more nodes of the business object instance.

15. A computer program product as in claim 10, wherein the ACL DO is accessed via an access path specified by the business object.

16. A computer program product as in claim 15, wherein the operations further comprise:
    granting access to the user to execute the operation on the instance of the business object if the access path can be traversed; and denying access to the user to execute the operation on the instance of the business object if the access path cannot be traversed.

17. A system comprising:

at least one data processor; and memory storing instructions which, when executed by the at least one data processor, result in operations comprising:

receiving a service request from a user to execute an operation on an instance of a business object, the business object comprising a plurality of nodes descending from a root node;

performing an access control check to confirm whether the user is allowed to execute the requested operation on a type of business object corresponding to the business object specified and based on an access group associated with the user; and     providing the user with access to the instance of the business object to execute the operation if the access control check confirms that the user is allowed to execute the operation on the instance of the business object; or     preventing the user from accessing the instance of the business object to execute the operation on the instance of the business object;

wherein metadata associated with the business object identifies one node of the business object as comprising an access control list dependent object (ACL DO), the ACL DO comprising an access control list, the access control list being used as part of the access control check to confirm whether the user is allowed to execute the requested operation, the access control list specifying which nodes of the business object are subject to instance control and which nodes of the business object are not subject to instance control, the access control list further specifying which access groups can perform operations on each node of a business object instance, the ACL DO being updated prior to saving the business object by using a modeled association of the nodes of the business object when one or more nodes of the business object specified as being part of an access control path by the ACL DO are changed.

18. A system as in claim 17, wherein the access control list further specifies what operations can performed on each node of the business object instance and by what access groups such operations can be performed.

19. A system as in claim 17, wherein the ACL DO comprises a root node and an entry node.

20. A system as in claim 19, wherein each entry node of the ACL DO stores access control attributes in name-value pairs comprising access context and access group identifiers.

21. A system as in claim 17, wherein the access control list specifies temporal access limitations one or more nodes of the business object instance, and wherein the ACL DO is accessed via an access path specified by the business object.

\* \* \* \* \*